INVENTORS.
ARNOLD H. KADISH.
DAVID A. HALL
BY FOWLER, KNOBBE
& GAMBRELL
ATTORNEYS.

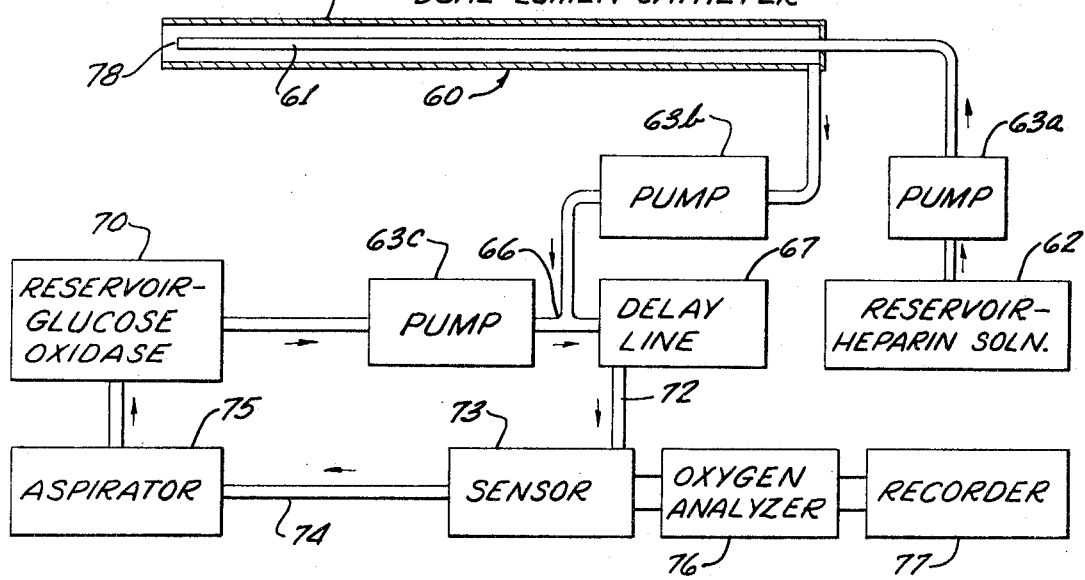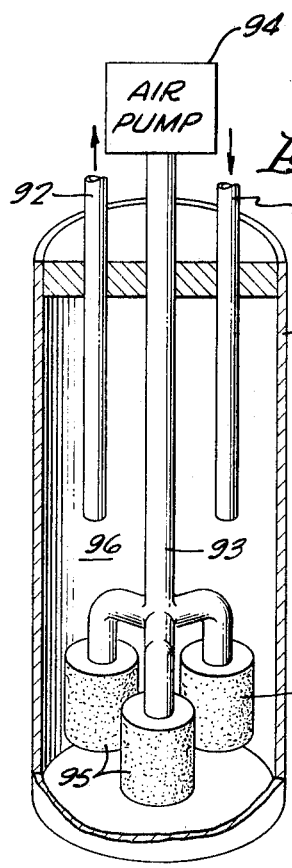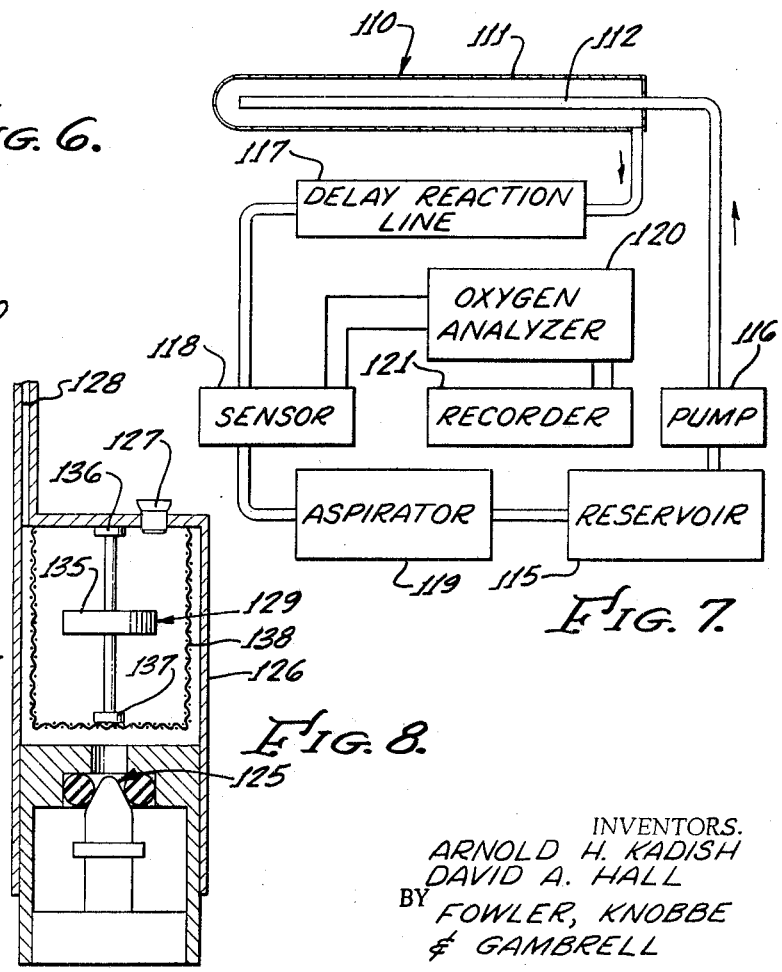

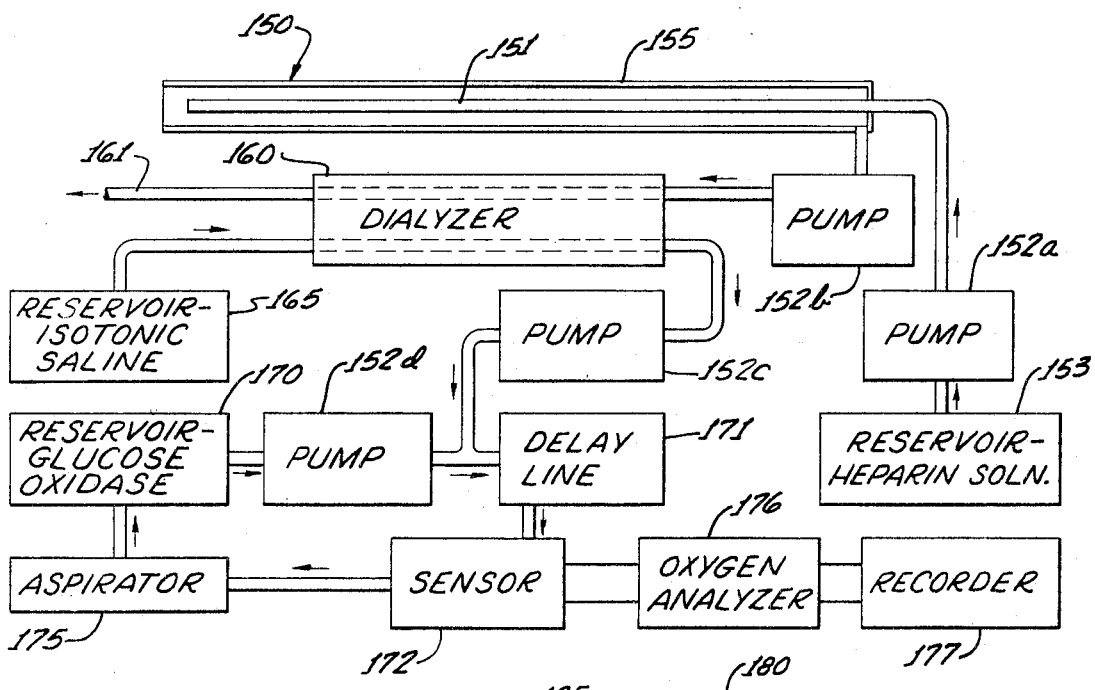
Fig. 9.
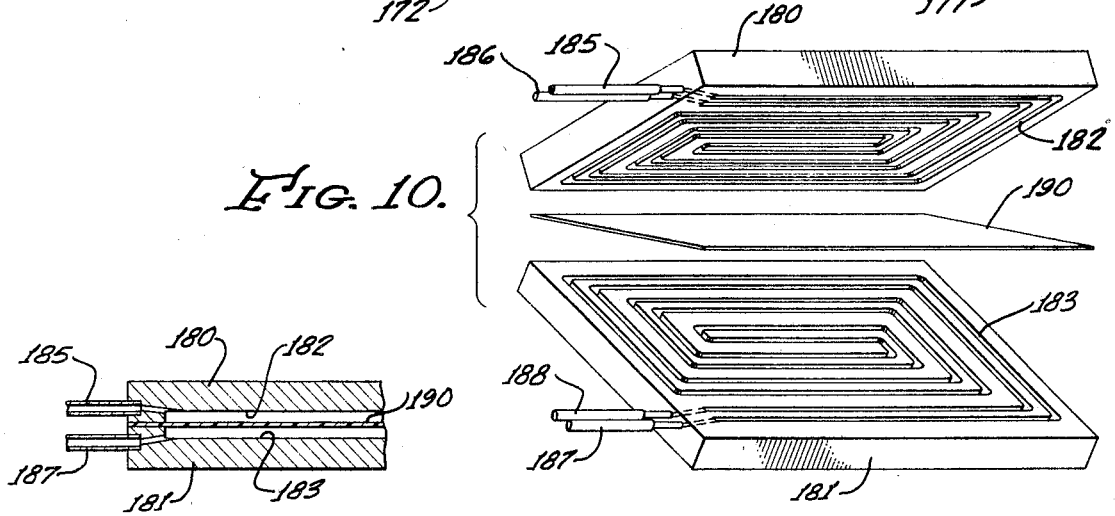
Fig. 10.
Fig. 11.
INVENTORS.
ARNOLD H. KADISH
DAVID A. HALL
BY FOWLER, KNOBBE
& GAMBRELL
ATTORNEYS.

United States Patent Office 3,512,517
Patented May 19, 1970

3,512,517
POLAROGRAPHIC METHOD AND APPARATUS FOR MONITORING BLOOD GLUCOSE CONCENTRATION
Arnold H. Kadish, Beverly Hills, and David A. Hall, San Gabriel, Calif., assignors to Beckman Instruments, Inc., a corporation of California
Filed Nov. 30, 1964, Ser. No. 414,685
Int. Cl. A61b 5/00
U.S. Cl. 128—2
22 Claims

ABSTRACT OF THE DISCLOSURE

Method and apparatus for continuously monitoring a human being's blood glucose concentration. Means is provided for sampling in vivo the blood of a human patient. The blood is diluted by an anti-coagulant and then reacted with glucose oxidase, an enzyme catalyst solution, whereby the oxygen dissolved in the solution is depleted in accordance with the blood glucose concentration. The remaining oxygen dissolved in the solution is measured by a polarographic oxygen sensor whereby the initial and final oxygen levels of the solution provides a measure of the blood glucose concentration.

---

The present invention relates to polarographic analysis systems and methods of performing polarographic analyses. In particular, the present invention is directed toward improved apparatus and methods for continuously monitoring in vivo particular components of the blood or other body fluids.

Although of general application, a specific example of a use for the present invention is that of continuously monitoring the glucose concentration in the blood of a human patient. The present invention enables the blood glucose to be monitored with a very short response time so that the necessary medical treatment, such as the injection of insulin, may take place in accordance with the actual need of the patient.

Heretofore, Arnold H. Kadish has described a means for physiological monitoring and control of blood sugar in medical journals as follows: Transactions of the American Society for Artificial Internal Organs, 9:363 (1963); Biomedical Sciences Instrumentation, 1:172 (1963); American Journal of Medical Electronics, 3:82 (1964); and California Medicine, 98:325 (1963). In these previous studies, blood is sampled continuously, mixed with anti-coagulant and the resultant solution analyzed for glucose by the conventional ferricyanide-ferrocyanide oxidation reduction reaction. Particular disadvantages of this technique are that the apparatus for accomplishing the analysis is complex and unsuited to miniaturization. Further, the response time of this procedure is approximately eight minutes.

It is, therefore, an object of the present invention to provide improved apparatus and methods for continuously monitoring a human being's blood-glucose concentration with a very short response time.

Another object of the present invention is to provide an apparatus for continuously monitoring in vivo blood or other body fluids which is substantially simplified over the prior art and adapted for miniaturization.

Still another object of this invention is to provide polarographic analysis apparatus and methods wherein the reagent solution is neither depleted nor appreciably diluted during the analysis.

Alternative embodiments of the invention described hereinafter contain numerous other features of significance. A particular object associated with one such embodiment is to provide a continuous glucose monitoring apparatus and method wherein whole blood is not removed from the patient.

Other and further objects, features and advantages of the invention may become apparent as the description proceeds.

Briefly, in accordance with the present invention, the whole blood or a component thereof is sampled, diluted by a suitable catalytic reagent and passed through a delay reaction chamber whereby the oxygen dissolved in the reagent solution is depleted in accordance with the blood glucose concentration. The remaining oxygen dissolved in the reagent is measured by a polarographic oxygen sensor whose output signal may be translated into direct oxygen measurement units. The difference between the initial and final oxygen levels as detected by the polarographic oxygen analyzer is a measure of the glucose concentration.

A preferred embodiment of the present invention incorporates a dialyzer wherein the blood component to be measured, e.g., inorganic ions, glucose, amino acids, etc., passes through the dialyzing membrane. The dialyzed component is then analyzed in the manner described hereinabove. The blood protein and formed elements, i.e., white cells, red cells and platelets, do not pass through the dialyzing membrane and may be returned to the patient. Accordingly, the blood may be monitored for an indefinite period of time without harm to the patient.

An advantage of the preferred embodiment is that the reagent solution does not become diluted with blood after a period of time, nor are the chemicals in the reagent depleted during the monitoring operation. As a result, a given volume of catalytic reagent solution may be continuously re-cycled for an extended period of time by passing the used reagent solution through an aerator for replacing the oxygen consumed during the reaction.

Another embodiment of the present invention incorporates an intravenous dialyzing catheter wherein the blood component to be measured passes through the dialyzing membrane of the catheter and is directly mixed therein with the analytic reagent. The blood proteins and formed elements do not pass through the dialyzing membrane and are never removed from the patient. This embodiment, therefore, permits the monitoring of blood chemistry without actually removing whole blood from the body. Further, it enables a system to be constructed having a minimal number of components and therefore particularly lends itself to miniaturization.

A more thorough understanding of the invention may be obtained by a study of the following detailed description taken in conjunction with the accompanying drawings, in which:

FIG. 5 is a detailed block diagram of a polarographic sensing system embodying the present invention;

FIG. 6 is a perspective view in cross-section of a preferred embodiment of an aspirator constructed for use in the present invention;

FIG. 7 is a block diagram of another embodiment of the present invention incorporating an intravenous dialyzing aspirator;

FIG. 8 is a cross-sectional view of another embodiment of this invention for montioring a constant volume of solution;

FIG. 9 is a detailed block diagram of a preferred embodiment of the present invention incorporating an external dialyzer;

FIG. 10 is an exploded view in perspective of a representative dialyzer unit for use in the embodiment of FIG. 9; and FIG. 11 is a fragmentary cross-sectional view of the dialyzer shown in FIG. 10.

Figure 1:
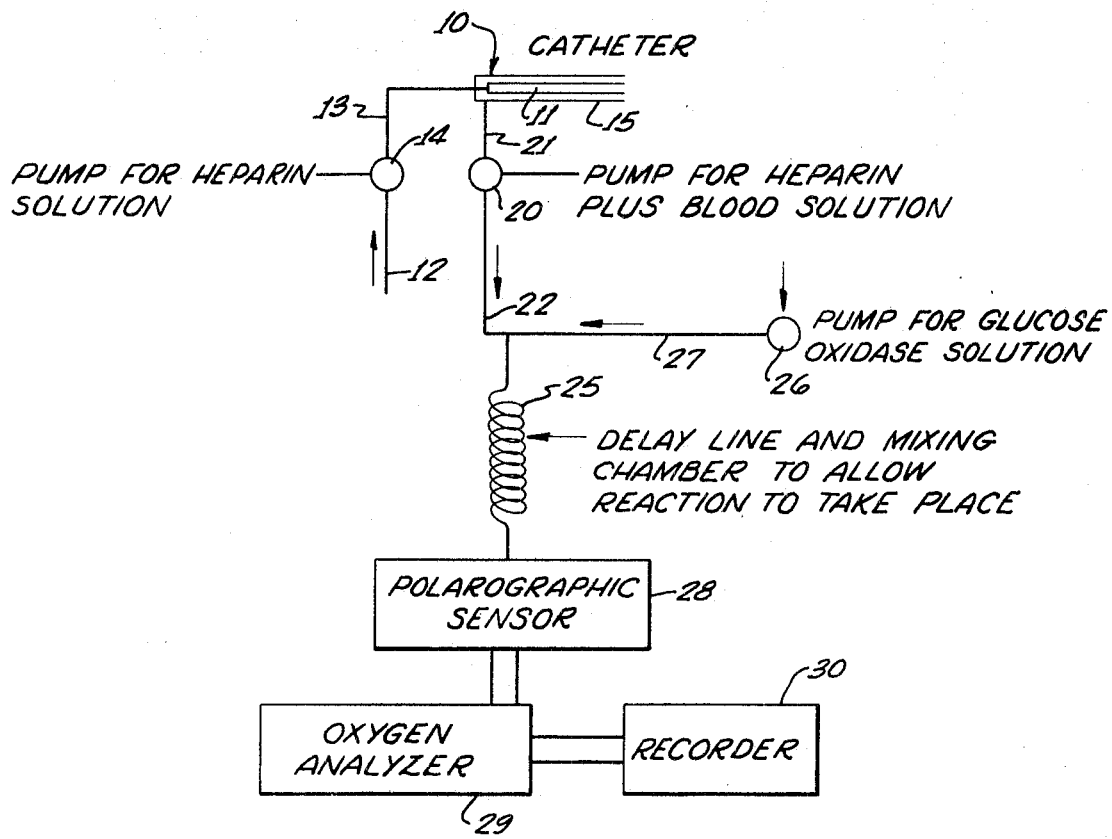
FIG. 1 is a block diagram of polarographic analysis systems according to the present invention.

Referring now to FIG. 1, there is shown a system for continuously monitoring the concentration of glucose of a human wherein a dual lumen catheter 10 is inserted into the patient's vein. An anti-coagulant solution such as heparin is supplied to the inner lumen 11 of the catheter by conduits 12, 13 and pump 14. The combined heparin and sampled blood is withdrawn from the outer lumen 15 of catheter 10 by pump 20 and delivered through conduits 21, 22 to the input of reaction chamber 25. Glucose oxidase, an enzyme catalyst solution, is also delivered to the input of chamber 25 by pump 26 and conduit 27. Reaction chamber 25 is formed as an elongated delay line so that the chemical reaction which takes place therein is maintained for a predetermined period of time. The addition of the glucose oxidase (GO) to the blood and heparin solution causes a reaction defined by the following equation:

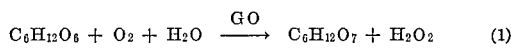

$$C_6H_{12}O_6 + O_2 + H_2O \xrightarrow{GO} C_6H_{12}O_7 + H_2O_2 \quad (1)$$

wherein:

$C_6H_{12}O_6$ is the glucose of the blood,
$C_6H_{12}O_7$ is gluconic acid, and
$H_2O_2$ is hydrogen peroxide.

The hydrogen peroxide produced by this reaction is subject to decomposition. Since this decomposition in certain situations is variable, non-reproducible results may occur. For this reason, ethanol and catalase (CAT) may be added to produce the reaction defined in the following equation:

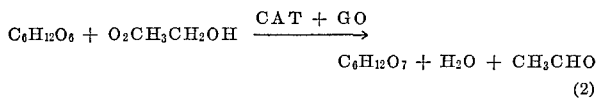

$$C_6H_{12}O_6 + O_2CH_3CH_2OH \xrightarrow{CAT + GO} C_6H_{12}O_7 + H_2O + CH_3CHO \quad (2)$$

Referring to Equations 1 and 2, it will be apparent that oxygen is consumed by the reaction in accordance with the glucose concentration in the blood. Accordingly, the difference between the initial oxygen level, which is maintained at the saturation level [i.e., a constant, predetermined level], and the final oxygen level of the solution at the output of reaction chamber 25 is a measure of the glucose concentration. Polarographic sensor 28 measures the oxygen dissolved in the solution of the output of chamber 25 to provide an electrical signal corresponding to the oxygen level of the fluid. The output of the sensor 28 is connected to an oxygen analyzer 29 which in turn is connected to a recorder 30. Alternatively, the output signal from analyzer 29 may be utilized for automatically controlling the injection of insulin or glucose or other necessary medicaments into the patient.

Figure 2:
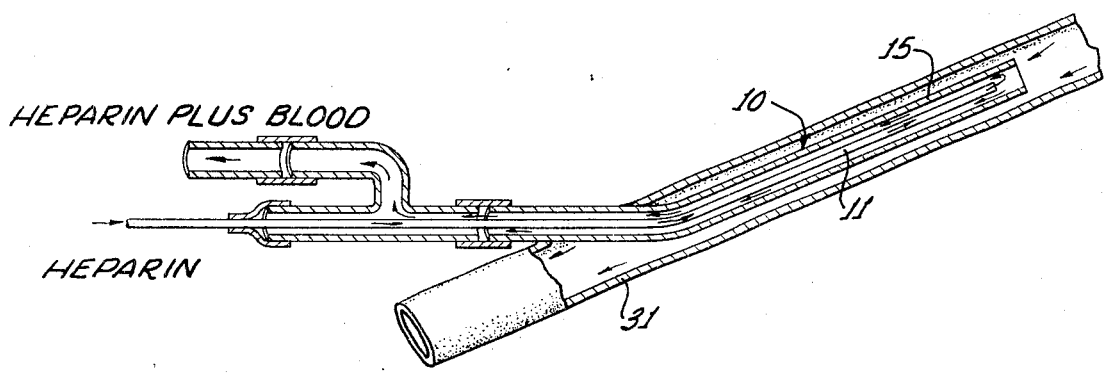
FIG. 2 is a perspective view, partially in cross-section, illustrating the insertion of a dual lumen catheter in a human being for blood sampling.

The dual lumen catheter 10 of FIG. 1 is shown in FIG. 2 as inserted to a blood vessel 31. The heparin or other anti-coagulant solution flows in the inner lumen to the tip, where it is mixed with the in-flowing stream of blood. Since the volume of the heparin stream is smaller than the total volume aspirated by the outer tube, the anti-coagulant is prevented from entering the blood stream of a patient. Advantageously, the catheter is formed of a flexible plastic tubing capable of being extended into the vein for several inches, e.g., 12 inches.

Figure 3:
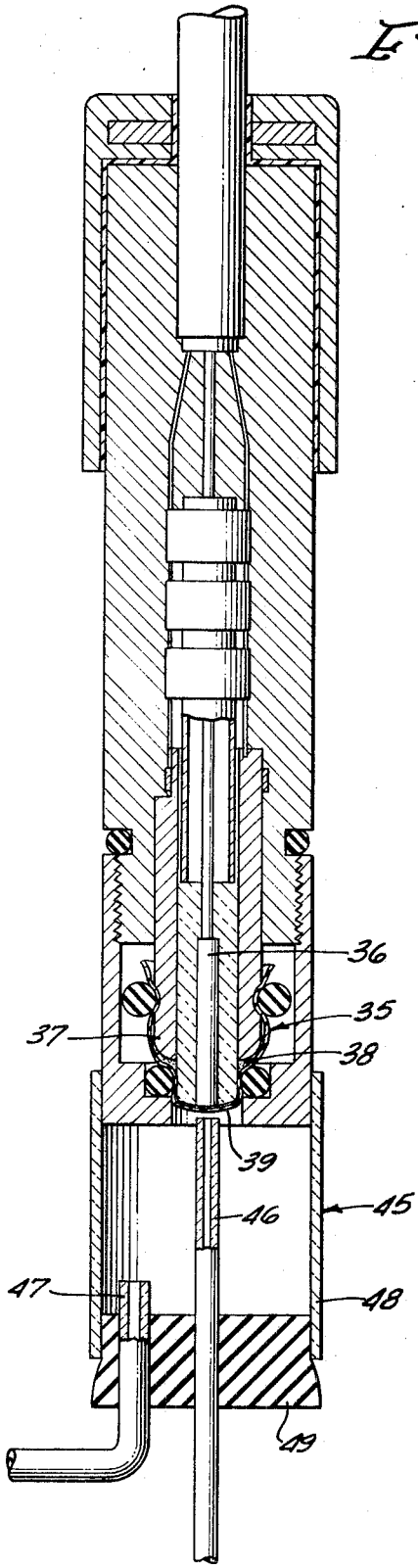
FIGS. 3 and 4 are respective embodiments of continuous monitoring polarographic sensors constructed in accordance with the present invention.
Figure 4:
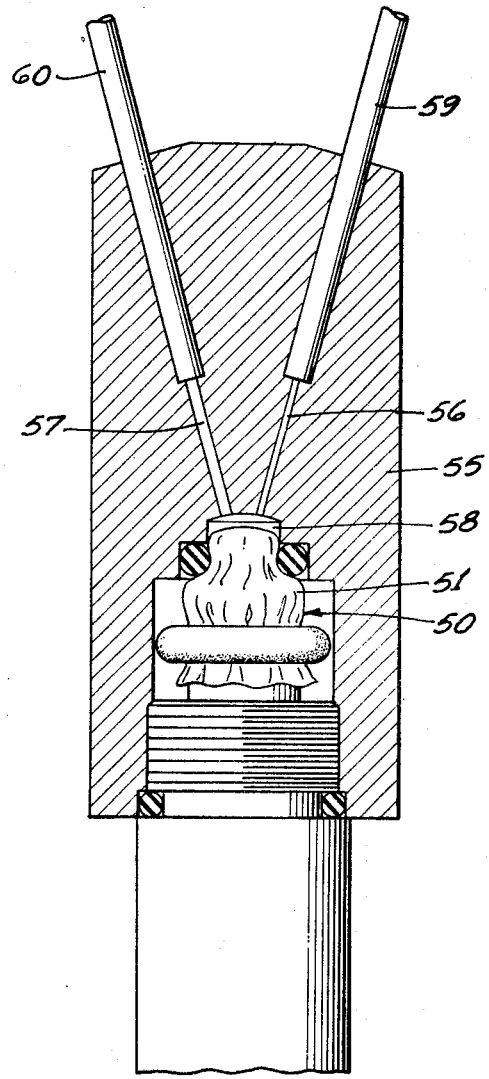

One embodiment of the polarographic sensor is shown in FIG. 3, and a preferred embodiment thereof in FIG. 4. Beckman Instruments, Inc., assignee of this invention presently manufactures and sells a commercial polarographic sensor electrode utilizing the teachings of U.S. Pat. No. 2,913,381—Clark, as the Beckman Oxygen Sensor. The modified electrode structures shown in FIGS. 3 and 4 are the invention of David A. Hall and are disclosed and claimed in the copending application Ser. No. entitled "Polarographic Sensor Electrode," filed on even date herewith and assigned to Beckman Instruments, Inc. Referring to FIG. 3, the sensor 35 includes an inner gold cathode or sensing electrode 36 and an annular outer silver anode electrode 37. An electrolyte forming substance 38 is retained in electrical current contact with the anode and cathode by a permeable membrane 39 electrically insulating the electrolyte. An insulated liquid-tight chamber 45 is affixed under the electrode structure comprising a cylindrical member formed of glass enclosed at one end with a rubber stopper 49. A very small, i.e., capillary tube 46 is retained by stopper 49 with one end terminating proximate the cathode electrode 36 and the other end located exterior of the chamber. An exhaust conduit 47 is spaced from the inlet capillary tube 46 and extends between the bottom portion of chamber 45 and the exterior thereof.

In use, the sensor structure of FIG. 3 continuously applies the detected fluid against whichever of the particular one of the electrodes is the sensor electrode. In polarographic analyzers of the type described in Letters Patent 2,913,386, the gold cathode electrode 36 is the sensing electrode. In the sensor of FIG. 3, the fluid flows out of the delay line reaction chamber 25 directly onto the cathode electrode 36. That part of the fluid which strikes the membrane 39 adjacent to the cathode electrode 36 is immediately deflected away from this electrode and into chamber 45 and thence to the exterior thereof. Accordingly, a continuous monitor of the dissolved oxygen level of the solution leaving the reaction chamber 25 is provided in order to minimize the delay in measuring the glucose concentration of the blood.

A preferred embodiment 50 of the polarographic sensor is shown in FIG. 4, including an inner cathode electrode, an annular outer electrode, and an electrolytic agent retained in contact with the anode-cathode by a thin permeable membrane 51 which electrically insulates the electrolyte from the liquid under test. As shown, although the electrode structure is similar to that of the embodiment of FIG. 3, the inlet and outlet conduits are formed above the electrode structure. Thus, member 55 is advantageously formed from a solid plastic such as Lucite having formed an inlet bore 56 terminated proximate the cathode electrode and directed along an axis oblique with respect to the axis of the cathode. A somewhat larger outlet bore 57 is formed on the opposite side of the cathode and also directed obliquely toward and terminating proximate to the cathode structure. The inlet and outlet bores 56, 57 respectively terminate in a small cavity 58 formed adjacent the cathode electrode.

Inlet and outlet tubes 56, 57 enter respective conduits 59, 60 also formed in the solid block and having substantially larger diameters. The small volume of chamber 58 prevents the formation of dead pockets of liquid near the cathode so that this sensing electrode is supplied solely with fluid flowing out of the inlet tube 56. The very small diameter inlet tube 56 insures a high-velocity stream of solution directed on the cathode electrode, thereby insuring that fresh solution is supplied to the sensor electrode.

By way of specific example, a very satisfactory sensor as shown in FIG. 4 has been constructed by forming the inlet tube with a diameter of .0135 inch and the outlet tube with a diameter of .0270 inch. The distance between the ends of these tubes and the sensor head should be no greater than .04 inch. Their respective supply conduits 59, 60 were formed with a diameter of .026 inch.

FIG. 5 illustrates in block diagram form another embodiment of the invention comprising a dual lumen catheter 60 having an inner lumen 61 supplied with a heparin solution or other anti-coagulant solution from reservoir 62 by pump 63a. The outer lumen 64 is connected via a pump 63b to a T connection 66 at the inlet of a delay reaction chamber 67. A reservoir 70 with enzyme reagent such as glucose oxidase is connected by pump 63c to the other side of the T connection 66. The outlet of delay reaction chamber 67 is connected to the inlet conduit 72 of polarographic oxygen sensor 73. The outlet conduit 74 of the oxygen sensor is connected to the reservoir 70 through an aspirator 75 for restoring the oxygen consumed in the reaction within the chamber 67. The electrical current produced within the polarographic sensor 73 is translated into direct oxygen measurement units in oxygen analyzer 76 connected to a suitable readout device such as recorder 77.

The operation of the system of FIG. 5 is as follows: The anti-coagulant solution mixes with the patient's blood at the tip 78 of the dual catheter 60. Pump 63b pumps the blood-heparin solution, and pump 63c pumps oxygen saturated enzyme reagent into the same conduit at the input of the delay reaction chamber 78 within which the reaction occurs for a predetermined period of time. The mixture, now depleted of oxygen in proportion to the amount of glucose present, passes over the polarographic oxygen sensor 73 at which time the hereinabove described reaction occurs. The output current of the sensor 73 is detected in the oxygen analyzer 76 and recorded on the readout apparatus 77.

Since the enzymes present in the reagent are not consumed in the reaction, the enzyme solution is returned to reservoir 70 after being aerated in aspirator 75. Accordingly, the same enzyme reagent may be continuously recycled over an extended period, with only the consumed oxygen being replaced by aspirator 75.

By way of specific example, actual components suitable for constructing the system of FIG. 5 are as follows: Dual lumen catheter 60 is made from polyethelyne tubing, the inner tubing having representative dimensions of 0.011 inch I.D. and 0.0240 inch O.D. and the outer lumen 65 having an outside diameter of 0.048 inch. Although the length of the catheter may be varied, a typical length is 12 inches. The tubing connecting the catheter to the remainder of the system and the connecting tubing within the system are made from polyethylne tubing having representative dimensions of 0.030 inch I.D. and 0.050 inch O.D.

Pumps 63a, 63b and 63c are advantageously respective channels of a single peristaltic pump and roller assembly with multiple flexible tubes as manufactured by the Holter Co., Bridgeport, Pennsylvania. The flow rates through each channel of this type of pump are determined by the size of the flexible tube and may be varied from 10 to 210 ml./hr. Representative pumping rates employed in the embodiment of FIG. 5 are: pump 63a—0.3 ml./minute; pump 63b—0.4 ml./minute and pump 63c—8 ml./minute. Instead of the multiple pump structure shown in the figure, a single pump (not shown) located between the T connecter and the delay reaction chamber 25 and metering valves (not shown) located in the positions occupied by pumps 63b and 63c may be used to provide a similar flow of fluids within the system.

The solutions used in the system of FIG. 5 for performing a continuous monitoring of the glucose concentration in the blood of a human patient briefly are advantageously as follows: The anti-coagulant contained within reservoir 62 is a dilute isotonic saline solution (20 USP units/ml.). Reservoir 70 contains a glucose oxidase solution to which is added a catalase, a buffer and a bacteriostat as follows:

Six grams buffer PH 6.86;
Three grams glucose oxidase;
25 ml. ethanol;
Five ml. catalase (3080 U/mg.);
Five drops bacteriostat solution in methanol;
Distilled water to produce one liter of solution.

A suitable buffer containing $KH_2PO_4$ and $Na_2HPO_4$ is manufactured by Beckman Instruments, Inch., under the designation No. 14268 PH 6.86. Glucose oxidase is sold by the Sigma Chemical Co., St. Louis, Mo., characterized by the following activities: 1 mg. will oxidize 14,000 micro moles of glucose to gluconic acid per minute at 35° C., PH 5.1. Catalase is available from the California Corp. for Biochemical Research. A preferred bacteriostat is butyl parahydroxybenzoate diluted in pure methanol for a concentration of approximately 20%.

Delay reaction line 67 comprises 50 feet of coiled polyethylene tubing 0.004 inch I.D. and 0.064 inch O.D. This length and size of tubing provides a reaction time of approximately one minute. The reaction described by Equations 1 and 2 above is approximately 70% complete in one minute and approximately 90% complete in 2.9 minutes. Therefore, in the continuous flow system of FIG. 5, the reaction is never brought to completion but instead, the glucose concentration is continuously measured and compared against known concentrations of standard control solutions.

Oxygen analyzer 76 is preferably a miniaturized version of the oxygen analyzer presently manufactured by Beckman Instruments, Inc., under the designation Beckman Model 777 Laboratory Oxygen Analyzer. A specific example for recorder 77 is a Versaprint recorder with a range of 0–3 microampers at 15,000 ohms, manufactured by Assembly Products, Inc., Temple City, Calif. The oxygen analyzer, recorder and peristaltic pump may be battery operated, and all of the equipment mounted within a small case so that the instrument may be easily carried for use in field physiological monitoring.

Reservoir 70 and aspirator 75 are advantageously constructed as an integral unit as shown in FIG. 6. Enclosed cylindrical tank 90 includes a solution inlet conduit 91, a solution outlet conduit 92 and an air inlet 93 having the exterior end connected to an air pump 94 and the interior end to plural coarse-grade sintered glass members 95 located near the bottom of the tank 90 which serve to make the air bubbles quite small so as to disperse the air from air inlet tube 93 into the liquid 96 and saturate same with oxygen.

An alternative embodiment of the present invention is shown in FIG. 7 and comprises a tubular intravenous dialyzing catheter 110 which permits the monitoring of blood chemistry without actually removing whole blood from the patient. Catheter 110 includes an outer dialyzing membrane 111 and an inner tubing 112. The material used for membrane 111 is suitable for dialyzing glucose or other dialyzable blood components from the whole blood removing the blood proteins and formed elements, i.e., white cells, red cells and platelets from the blood, a specific example being polyethylenevinylpyrrolidone, sold under the trademark Permion-300 by Radiation Applications, Inc. Representative dimensions for the catheter 110 are an overall length of 12 inches, an outside diameter of 0.048 inch for the membrane 111, an I.D. of 0.011 inch and an O.D. of 0.24 inch for the inner tubing 112 inserted into the membrane 111 such as there is a ⅛ inch distance between the closed end of the dialyzing membrane and the open end of the polyethylene tubing.

The dialyzed component such as glucose and the enzyme reagent are mixed within the catheter by pumping the reagent from reservoir 115 through pump 116 to the tip of the inner tubing 112. Enzyme reagents such as glucose oxidase cannot pass through the dialyzing membrane 111, thereby preventing them from entering the patient's blood stream. The reagent-dialsate mixture passes through delay reaction line 117 to the polargraphic sensor 118. The detected mixture is saturated with oxygen in the aspirator 119 and returned to reservoir 115. As described above, the current output of the sensor 118 is converted by oxygen analyzer 120 into a measurement according to the oxygen content of the monitored solution and recorded by recorder 121.

Pump 116 is advantageously provided by a peristaltic roller pump, a particular advantage of the system of FIG. 7 being that only a single fluid manifold is required for achieving a continuous monitoring of the blood chemistry. The delay reaction line 117, sensor 118, oxygen analyzer 120 and recorder 121 may incorporate, by way of example, the specific components described hereinabove in connection with FIG. 5. Pump 116, aspirator 119 and reservoir 115 are preferably constructed as the integral unit shown in FIG. 6. A heavy alcohol having a large enough molecular weight so as to prevent passage through the membrane 111 is substituted for ethanol in the reagent solution. In most instances, however, the alcohol is not required to achieve accurate results.

It will be apparent that the use of the intravenous dialyzing catheter substantially reduces the number of components in the continuous monitor system, thereby the miniaturization of the system. Another feature of this embodiment is that it does not remove whole blood from the patient but instead only particular blood components that are rapidly replaced by the metabolism of the body. A further advantage is that the reagent solution does not become diluted with blood (nor with water passing across the membrane 111 if the reagent is made isotonic with blood). Accordingly, the system may be used to monitor a patient for an indefinite period of time while using the same reagent solution.

In some types of experimental work, it may be desirable to measure the concentration of a particular component in a given volume of blood, rather than from a continuous flow as described hereinabove. For such measurements, the apparatus of FIG. 8 has been found to be very satisfactory and includes a polarographic sensor electrode 125 as described hereinabove, a reaction chamber 126 attached to the end of the sensor having a serum cap 127 adapted to be filled from a hypodermic needle, an exhaust outlet 128 and a magnetic stirrer 129 is provided within chamber 126. The stirrer includes rotatably mounted magnet 135 supported in a bearing 136 attached to one end of the chamber 126 and another bearing 137 suspended by a porous support structure 138. A suitable rotating magnetic field applied to the exterior of chamber 126 causes the stirrer magnet 135 to rotate and continuously move the solution within chamber 126

A preferred embodiment of the present invention is shown in FIG. 9 and comprises a dual lumen catheter 150 adapted for insertion into the patient's vein. Catheter 150 includes an inner lumen 151 supplied with heparin by means of pump 152a and reservoir 153. The combined heparin and sampled blood is withdrawn from the outer lumen 155 of the catheter by pump 152b through a dialyzer 160 and may be returned via tube 161 and a single lumen catheter (not shown) to the patient's vein. Reservoir 165 contains an isotonic saline solution which is pumped through the other side of the dialyzer 160 by pump 152c in a direction opposite to that of the blood in order to obtain a counter current effect. Pumps 152b and 152c pump at the same rate so that the flow rates, and thus the pressures on either side of the dialyzer, are equal.

The blood component to be measured passes by dialysis from the blood-heparin mixture to the isotonic saline solution and is mixed with glucose oxidase from reservoir 170 and pump 152d at the input of the delay line reaction chamber 171. At the outlet of the reaction chamber is connected the polarographic sensor 172 which determines the amount of oxygen remaining in the solution after the reaction, the tested solution being returned to the reservoir 170 through an aspirator 175. The electrical output of the sensor is connected to the oxygen analyzer 176 which drives a recorder 177 in the manner described hereinabove.

It will thus be seen that the embodiment of FIG. 9 provides a continuous sampling of the blood component of interest and a means for isolating the whole blood from the glucose oxidase mixture. Accordingly, the reagent solution does not become diluted with blood after a period of time so that the same solution may be used continuously for an indefinite period of time. Furthermore, the dialyzer isolates the patient's blood from the enzyme catalyst solution, thereby insuring that the reagent does not enter the blood of the patient.

Referring now to FIGS. 10 and 11, the dialyzer advantageously comprises a pair of plates 180, 181 having formed in their opposite faces matching the labrinth grooves 182, 183. By way of specific example, the labyrinth groove may be of the order of 87 in. long and have a generally rectangular configuration 0.01 in. deep and 0.06 in. wide. The respective ends of this groove 102 are connected to inlet tubes 185, 186 and the respective ends of groove 183 are connected to inlet tubes 187, 188. A dialyzing membrane 190 such as cellophane is placed between the blocks. The blocks are clamped together by a suitable means to tightly seal upon the dialyzing membrane as shown in FIG. 11.

While the invention has been specifically described hereinabove for use as a glucose monitor, each of the systems described hereinabove are readily utilized for monitoring numerous other blood components, including inorganic salts, nitrogenous substances, non-nitrogenous organic compounds and gases in solution. Each of the categories includes a number of compounds and elements therein. Thus, inorganic salts include chlorides, carbonates, bicarbonates, sulfates, phosphates and iodides of sodium, potassium, calcium, magnesium and iron. Nitrogenous substances include ammonium salts, urea, uric acid, creatine, creatinine, amino acids, xanthine and hypoxanthane. Non-nitrogenous organic compounds include, besides glucose, neutral fats, phospholipids and cholesterol. Gases in solution include oxygen, carbon dioxide nitrogen and intestinal gases.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim:
1. An apparatus for continuously monitoring the blood glucose concentration lvel of a human comprising
  means for substantially continuously sampling in video a small quantity of blood from the human patient,
  first mixing means coupled to said blood sampling means and a source of anti-coagulant for mixing said blood and said anti-coagulant,
  a source of enzyme reagent having oxygen dissolved therein at a constant level;
  second mixing means coupled to said first mixing means and said source of enzyme reagent for mixing the blood and anti-coagulant mixture with enzyme reagent and maintaining the resulting chemical reaction for a predetermined period of time so that the oxygen dissolved in the reagent solution is depleted in accordance with the blood glucose concentration,
  a polarographic oxygen sensor having a sensing electrode remote from said source of enzyme reagent, and
  means for directing a substantially continuous flow of solution resulting from said reaction over said sensing electrode of said polarographic oxygen sensor to measure the remaining oxygen dissolved in solution and thereby measure the blood glucose concentration.

2. An apparatus for substantially continuously monitoring a component of blood of a human patient comprising
  means for sampling in vivo the blood of a human patient,
  a catalytic reagent reservoir, means coupled to said reservoir and sampling means for mixing the sampled blood with a catalytic reagent so that the oxygen dissolved in the reagent is depleted in accordance with the blood component concentration, and a polarographic oxygen sensor coupled to the outlet of said mixing means for measuring the remaining oxygen dissolved in solution and thereby measuring the concentration of said blood component.

3. The apparatus defined in claim 2 wherein
said sampling means comprises an intravenous dialyzing catheter including a dialyzing membrane forming an elongated enclosed chamber and
wherein said mixing means includes an inner tubing extending into said chamber for carrying the catalytic reagent into said chamber and mixing therein with the dialyzed blood component.

4. The apparatus in claim 2 comprising
a source of anti-coagulant coupled to said sampling means so that the blood introduced in said mixing means includes the sampled blood and anti-coagulant.

5. The apparatus defined in claim 2 comprising
means coupled to the exhaust outlet of said polarographic oxygen sensor for re-saturating the used catalytic reagent solution with oxygen after it has passed over said sensor.

6. The apparatus defined in claim 5 wherein
said means for saturating said exhausted solution with oxygen comprises
a container having a solution inlet and a solution outlet and
an air inlet means having one end coupled to a source of air and the other end being located within such container and having means for producing small air bubbles.

7. The apparatus defined in claim 6 wherein
said means for producing small air bubbles comprises plural coarse-grade sintered glass members connected to said air inlet means.

8. The apparatus defined in claim 5 comprising
means for recycling the re-saturated catalytic reagent through said mixing means.

9. The apparatus described in claim 2 comprising
dialyzer means connected to the outlet of said sampling means for separating dialyzable blood components from said sampled blood.

10. The apparatus described in claim 9 wherein said dialyzer means comprises
a dialyzing membrane, and
means for supplying said sampled blood to one side of said membrane and an isotonic solution to the other side thereof and, means connecting said other side of said membrane to said mixing means.

11. An apparatus for continuously monitoring in vivo the concentration of a dialyzable blood component comprising
an intravenous catheter including
an outer dialyzing membrane formed as an elongated closed tubular member having an opening in one end adapted to be connected to a fluid conduit and
an inner tubing inside said tubular member and extending substantially the entire length thereof, one end of said tubing terminating inside said member adjacent the other end thereof and the other end of said tubing extending to the exterior of said member near said one end thereof.

12. An apparatus for continuously monitoring the blood glucose concentration of a human comprising
means for continuously sampling in vivo the blood of the human patient,
dialyzer means connected to said sampling means for separating the glucose from the blood sample, a source of enzyme reagent having oxygen dissolved therein at a constant level,
means coupled to said dialyzer means and said source of enzyme reagent for mixing the blood glucose with said reagent and maintaining the resulting chemical reaction for a predetermined period of time so that the oxygen dissolved in the reagent is depleted in accordance with the blood glucose concentration,
a polarographic oxygen sensor having a sensing electrode remote from said source of enzyme reagent, and
means for directing a substantially continuous flow of solution resulting from said reaction over said sensing electrode of sad polarographic oxygen sensor to measure the remaining oxygen dissolved in solution and thereby measure the blood glucose concentration.

13. An apparatus for continuously monitoring the blood glucose concentration of a human comprising
a dual lumen catheter for continuously sampling in vivo the blood of the human patient, said catheter comprising an outer tube open at one end and an inner tube terminating short of the open end of said outer tube,
a first reservoir for holding an anti-coagulant solution,
a first pump coupled between said reservoir and said inner tube,
a second reservoir for holding an enzyme reagent solution,
means connected to said second reservoir for saturating with oxygen the reagent solution in said reservoir,
a delay line reaction chamber,
a second pump connected between the outer tube of said catheter and the input of said reaction chamber,
a third pump connected between said second reservoir and the input of said reaction chamber,
a polarographic oxygen sensor connected to the outlet of said delay line reaction chamber, and
a conduit means for returning the used reagent solution from said sensor to said second reservoir.

14. An apparatus for continuously monitoring the blood glucose concentration of a human comprising
a dual lumen catheter for continuously sampling vivo the blood of a human patient, said catheter comprising an outer tube open at one end and an inner tube terminating short of the open end of said outer tube,
a first reservoir holding an anti-coagulant solution,
a first pump coupled between said reservoir and one of said tubes,
a dialyzer having first and second fluid channels separated by a dialyzing membrane,
a second pump coupled between the other of said tubes of said catheter and the inlet of the first fluid channel of said dialyzer,
a second reservoir for holding an isotonic saline solution connected to the inlet of the second fluid channel of said dialyzer,
a delay line reaction chamber,
a third pump connected between the outlet of the second fluid channel of said dialyzer and the input of said reaction chamber,
a third reservoir holding an enzyme reagent solution,
a fourth pump connected between said third reservoir and the input of said reaction chamber, and
a polarographic oxygen sensor connected to the outlet of said delay line reaction chamber.

15. An apparatus for continuously monitoring in vivo the blood glucose concentration of a human comprising
an intravenous catheter having
an outer dialyzing membrane formed as an elongated closed member having an opening in one end, a fluid conduit connected to said opening and an inner tube extending substantially the entire length of said outer member, said tubing extending to the exterior of said membrane;

a reservoir for holding an enzyme reagent solution;

a pump coupled between said reservoir and the inner tube of said intravenous catheter;

a delay line reaction chamber having its inlet connected to the fluid conduit of said intravenous catheters; and a polarographic oxygen sensor connected to the outlet of said delay line reaction chamber.

16. The method for monitoring a dialyzable component of blood comprising the steps of inserting an enclosed dialyzing membrane in the blood stream of a human patient, supplying a catalytic reagent to the interior of said enclosed membrane so that a chemical reaction results wherein the oxygen dissolved in the reagent is depleted in accordance with the dialyzable blood component concentration, and measuring the remaining oxygen dissolved in said reagent solution following said chemical reaction.

17. An apparatus for continuously monitoring a blood component such as blood glucose concentration of a living subject comprising:

means for continuously sampling in vivo the blood of the subject;

mixing means having an inlet and an outlet;

pumping means for conveying blood from said sampling means to the inlet of said mixing means;

second pumping means for conveying a catalytic reagent to the inlet of said mixing means whereby the sampled blood is mixed with the reagent in the mixing means so that the oxygen dissolved in the reagent is depleted in accordance with the blood component concentration; and an electrochemical cell coupled to the outlet of said mixing means, said cell being capable of measuring the remaining oxygen dissolved in solution and thereby measuring the concentration of said blood component.

18. An apparatus as set forth in claim 17 including: dialyzing means having an inlet and an outlet, said inlet being connected to said sampling means and said outlet being connected to the inlet of said mixing means.

19. An apparatus as set forth in claim 18 including: a source of anti-coagulant coupled to said sampling means so that the solution introduced into said dialyzing means includes the sampled blood and anti-coagulant.

20. A method for determining a component of blood comprising the steps of:

sampling in vivo the blood of a living subject;

mixing the sampled blood with a catalytic reagent having a constant level of oxygen therein so that a chemical reaction results wherein the oxygen dissolved in the reagent is depleted in accordance with the blood component concentration;

directly contacting the blood-reagent mixture with an electrochemical oxygen sensor capable of measuring oxygen dissolved in solution; and measuring with said sensor the remaining oxygen dissolved in the mixture following said chemical reaction.

21. A method as set forth in claim 20 wherein said reagent is an oxygen saturated enzyme.

22. A method for determining a dialyzable component of blood comprising the steps of:

sampling in vivo the blood of a living subject;

separating the dialyzable blood component from the sampled blood by dialysis;

mixing the dialyzable blood component with an enzyme reagent solution having a constant level of oxygen therein so that a chemical reaction results and maintaining the resulting chemical reaction for a predetermined period of time so that the oxygen dissolved in the reagent solution is depleted in accordance with the concentration of the dialyzable blood component;

directly contacting the blood component-reagent mixture with an electrochemical oxygen sensor capable of measuring oxygen dissolved in solution; and measuring with said sensor the remaining oxygen dissolved in the mixture following said chemical reaction.

References Cited

UNITED STATES PATENTS

| | | | |
|---|---|---|---|
| 2,706,927 | 4/1955 | Wood | 88—14 |
| 2,755,243 | 7/1956 | Beckmann et al. | 204—195 |
| 2,848,308 | 8/1958 | Free | 23—253 |
| 3,049,118 | 8/1962 | Arthur et al. | 128—2 |
| 3,224,433 | 12/1965 | Von Delebar | 128—2 |
| 2,224,436 | 12/1965 | Le Massena | 128—2.1 |
| 3,009,862 | 11/1961 | Dobrick | 195—103.5 |
| 3,043,303 | 7/1962 | Still | 128—214 |
| 3,241,432 | 3/1966 | Skeggs et al. | 23—230 X |
| 3,367,849 | 2/1968 | Blaedel et al. | 23—230 X |

FOREIGN PATENTS 1,280,481  11/1961  France.

OTHER REFERENCES

Weller et al.—Annals of N.Y. Acad. of Sciences, vol. 87, pp. 658–668, 1960.

Clark et al.—Annals of N.Y. Acad. of Sciences vol. 102 pp. 29–45, Oct. 31, 1962.

DALTON L. TRULUCK, Primary Examiner

U.S. Cl. X.R.

128—214; 23—258.5